Patented Nov. 10, 1936

2,060,587

UNITED STATES PATENT OFFICE 2,060,587

OIL AND FAT TREATMENT AND PRODUCT

Roy C. Newton and Donald P. Grettie, Chicago, Ill., assignors to Industrial Patents Corporation, Chicago, Ill., a corporation of Delaware No Drawing. Application August 15, 1932, Serial No. 628,960

17 Claims. (Cl. 99—163)

This invention relates to the treatment of oils and fats and the products thereof. More particularly this invention relates to edible oils and fats such as shortening and salad oil.

One of the objects of this invention is to provide a method for stabilizing shortening products and the like against rancidity.

Another object of this invention is to provide a process for winterizing cottonseed oil. Another object of this invention is to provide a stabilized shortening product. Other objects of this invention will be apparent from the description and claims which follow.

It is well known that many shortening products, such as lard and the like, become rancid and acquire a disagreeable odor and taste as a result of chemical reaction between the unsaturated fatty glycerides present in the shortening, and the oxygen of the atmosphere. It is, therefore, desirable to stabilize edible oils and fats against rancidity.

In the manufacture of shortening products, it is often desirable to incorporate air into the body of the fat to produce the desired color and consistency. It is apparent that the oxygen in the air, finely dispersed throughout the mass, increases the danger of rancidity, due to a very considerable difference between the various fats and oils with respect to the rate of oxidation when exposed under these conditions.

It has become the practice to utilize only a small number of fats in the production of high-grade shortening products.

By the present invention, certain fats which do not have natural resistance to oxidation are rendered more stable and less easily oxidized. By the practice of the method of the present invention, it is possible to produce shortening products, having greatly improved resistance to rancidity, from fats which are otherwise easily oxidized. We have found that some fats and oils possess naturally occurring anti-oxidants which are removed by caustic refining.

The commercial production of reasonably stable, edible fats from vegetable oils involves caustic refining. In the process of caustic refining, the oil or fat is melted and while in this condition treated with an aqueous solution of sodium hydroxide. The sodium hydroxide reacts with the free fatty acids present in the melted oil to form soaps which readily settle out with the water and may be removed by decantation followed by filtration. This treatment with caustic soda removes many gums and resinous materials which occur naturally in crude vegetable oils, but, which, from the standpoint of the refiner, are considered to be impurities.

We have discovered that some of these impurities have very definite anti-oxidant properties.

Our invention contemplates supplying these anti-oxidant bodies to oils and fats which lack them, whether their absence is due to the source of the material as in the case of lard, or the treatment to which the product has been subjected as in the case of refined cottonseed oil. This we do by adding a small portion of crude oil which is high in natural anti-oxidant content.

In the treatment of lard, for example, we add a small amount of from one to five per cent of crude hot-pressed cottonseed oil, and thereafter chill and then package and market the product in the usual way.

In the manufacture of a salad dressing product such as mayonnaise, French dressing, and the like, it is necessary to emulsify oil with the other ingredients in such a manner as to form a stable or pseudo-stable emulsion of the oil-in-water type.

It is a matter of common knowledge that some oils are more suitable than others for producing this type of emulsion. For example, olive oil, because of its flavor and ease of emulsification, has long been a favorite oil for use in the production of salad dressing. Peanut oil is also highly desirable for this purpose because of its flavor and the ease with which it emulsifies.

In recent years the large supply of cottonseed oil has led to its use in salad dressings, especially in this country and to some extent in foreign countries.

It has been shown that the presence of an excessive amount of the harder portion of cottonseed oil consists of tri-stearine, tri-palmitin, etc. These substances crystallize within the oil droplets of the emulsion after the emulsion is held or stored at a low temperature, and the crystals thus formed pierce the protective film around the droplets of oil, causing the emulsion to break down and separate into its respective phases.

It has long been the practice, in preparing cottonseed oil for use in salad dressings, to subject the cottonseed oil to a winterizing process.

In this process the oil is held at a low temperature for a definite period of time, until a portion of the harder constituents in the oil has had an opportunity to crystallize, after which the oil is passed through a filter to remove the crystallized fat. The soft portion which passes through the filter is deodorized and used for salad oil.

The conventional winterizing process is, at best, expensive because of the equipment and space which it requires, since it is necessary to hold the oil at a low temperature for several days to allow sufficient crystallization to produce the best salad oil. It is known that a longer period in seeding tanks permits more complete separation of the stearine, and gives a product which has less tendency to seed-out or solidify after having been worked into an emulsion. It is the common practice, therefore, to seed cottonseed oil long enough, and at a sufficiently low temperature, to produce a soft oil fraction which will withstand temperatures of 32° F. for at least ten hours. For the best product to be used in commercial emulsions, requiring handling in winter temperatures, it is desirable to have an oil which will withstand the cold test at 32° F. for longer than ten hours, and by seeding for an exceptionally long time, which involves, of course, additional expense, the cold test can be lengthened to fifteen or twenty hours, and in the case of some oils, to a slightly longer period.

By the present invention, it is possible to produce a winterized cottonseed oil for salad oil purposes which will withstand the cold test at 32° F. for a much longer period of time than the known winterizing process permits.

The present invention also permits the production of a winterized cottonseed oil without the additional outlay of time and equipment required for winterizing for excessively long periods of time.

We have discovered that crude cottonseed oil, before it is treated with caustic soda, possesses certain properties, probably due to the presence of natural gums and resinous material, which tend to prevent the crystallization of stearine. We have found that it is possible to increase the cold test of winterized cottonseed oil materially by the addition of a small percentage of crude cottonseed oil.

The application of our invention to winterized cottonseed oil may perhaps best be explained by an example. Crude cottonseed oil as it comes from the mill is treated with caustic soda by any of the usual processes to remove the free fatty acids and excessive color due to the presence of impurities. This oil is then winterized by seeding at low temperatures for the usual periods of time, and thereafter filtered to remove the crystals of tri-stearine and other solid, fatty glycerides. To this winterized product, which would ordinarily be ready for deodorization and subsequent use, we add a small percentage of a selected crude cottonseed oil, which has the effect of retarding further crystallization of the stearine. The amount of crude oil necessary to accomplish this improvement in the quality of the salad oil is relatively small. We have noticed very material improvement with amounts as low as 0.5%. On the other hand, there is further improvement with larger amounts, and we have in some cases used as much as 5%. These percentages are given by way of illustration and not by way of limitation.

The mixture of winterized and crude cottonseed oil which has been thus prepared is then, in accordance with our invention, subjected to deodorization by any of the usual methods of carrying out this process, such as blowing with steam, either with or without a vacuum, etc.

In selecting the crude cottonseed oil to be added in carrying out this invention, it should be remembered that some crude cottonseed oil, especially cold pressed oil, contains an ingredient known as gossypol, which has undesirable physiological effects when taken into the human digestive tract. This substance is ordinarily removed by caustic refining which would destroy the value of crude cottonseed oil for the purpose of the present invention. Consequently, when carrying out our invention in connection with edible fats and oils for shortening or salad oil, as has been described, we prefer to select oils from hot pressed mills which show a negative test for gossypol. Gossypol is ordinarily absent in hot pressed oils since it is in part precipitated with the meal and in part destroyed by the heat.

We have found that winterized cottonseed oil produced in accordance with our invention is increased in stability, under most conditions, more than 100 per cent. For example, in one test, we prepared salad oil from winterized cottonseed oil, which, due to the crystallization of stearine, showed cloudiness in twenty-one hours when held at 32° F. The same salad oil, to which had been added five-tenths per cent of crude cottonseed oil, showed cloudiness in forty-eight hours when held at 32° F. The same salad oil, to which one per cent crude cottonseed oil had been added, showed cloudiness in fifty-five hours when held at 32° F. The same salad oil with three per cent crude cottonseed oil added, showed only very slight cloudiness after being held for ninety-six hours at 32° F.

It will be seen, therefore, that we have invented a process which increases the stability of edible oils and fats, and when used with winterized cottonseed oil produces a salad oil of better cold test than may be secured by the ordinary known methods.

It will be also understood that such cottonseed oil or other products may be variously treated if desired, in any manner which does not destroy the anti-oxidant value of the material. For example, crude cottonseed oil may be deodorized by blowing with steam or otherwise, before being used in the practice of our invention, or the product manufactured in accordance with our invention may be deodorized or otherwise treated in any manner which will not destroy the value of the anti-oxidant bodies present in the product, or in the case of winterized cottonseed oil, will not destroy the crystallizing inhibiting properties thereof.

Attention is called to United States Patent No. 1,911,222 to Walter F. Bollens and Roy C. Newton, entitled Shortening agents and method of producing the same, wherein an improved process of chilling lard and other shortening products is described and claimed, whereby an improved product, having improved creaming qualities, is produced, and in which the size and shape of the crystals produced by the chilling operation are so altered, as compared with the ordinary chilled products, that the resulting semi-solid material when used in the preparation of cakes, icings, and the like, will retain more air or moisture in a finely divided state.

In the case of ordinary chilled products, melted fats, which would ordinarily solidify when left to stand at room temperature, will remain in a liquid condition for some time after a few per cent of crude cottonseed oil has been added. The effect on the crystallization in such case is clearly beyond that which would be expected by reason of the addition of such a quantity of liquid oil, as we have found by adding the same amount of refined cottonseed oil in a control test. The addition of a few per cent of crude cottonseed oil to a shortening product such as hydrogenated vegetable oil, or hydrogenated lard, markedly influences the rate of crystallization during chilling.

Furthermore, the addition of a proper amount of crude cottonseed oil materially aids the creaming qualities of the finished product.

Having thus described our invention:

We claim:

1. As an article of commerce, a stabilized shortening product consisting of a large percentage of caustic refined oils and fats and a complement of crude cottonseed oil.

2. As an article of commerce, a stabilized shortening product consisting of substantially 95 to 99 per cent caustic refined oils and fats and a complement of crude cottonseed oil.

3. A stabilized food product consisting of caustic refined shortening and a small added percentage of deodorized crude cottonseed oil.

4. A new food product consisting of a large percentage of winterized caustic refined cottonseed oil and a complement of crude cottonseed oil.

5. The method of stabilizing fats and oils which consists in first caustic refining the material and then incorporating therein a small percentage of crude cottonseed oil as a stabilizing agent.

6. The method of stabilizing lard which consists in adding thereto a small percentage of crude cottonseed oil as a stabilizing agent.

7. The method of manufacturing a salad oil which consists in first caustic refining crude cottonseed oil, then winterizing the caustic refined oil by seeding, removing crystals of solid fatty glycerides and then adding a small percentage of crude cottonseed oil to retard further crystallization of solid fatty glycerides.

8. The method of manufacturing a salad oil which consists in adding a small amount of crude cottonseed oil to winterized caustic refined cottonseed oil.

9. The method of manufacturing salad oil which consists in adding a small amount of deodorized crude cottonseed oil to winterized caustic refined cottonseed oil.

10. The method of manufacturing a salad oil which consists in adding a small amount of crude cottonseed oil to winterized caustic refined cottonseed oil and thereafter deodorizing the material.

11. As an article of commerce, a stabilized shortening product consisting of a large percentage of caustic refined oils and a complement of crude cottonseed oil.

12. As an article of commerce, a stabilized shortening product consisting of substantially 95 to 99 per cent caustic refined oils and a complement of crude cottonseed oil.

13. As an article of commerce, a stabilized shortening product consisting of a large percentage of caustic refined fats and a complement of crude cottonseed oil.

14. As an article of commerce, a stabilized shortening product consisting of substantially 95 to 99 per cent caustic refined fats and a complement of crude cottonseed oil.

15. A stabilized food product consisting of caustic refined shortening and a small added percentage of deodorized crude cottonseed oil, the entire mass being deodorized.

16. A method of stabilizing edible fats and oils which consists in first caustic refining the fats and oils, then adding thereto a small percentage of crude cottonseed oil and thereafter stabilizing the mixture to a deodorizing temperature.

17. The method of stabilizing edible oils and fats which consists in first caustic refining and deodorizing the oils and fats and then adding thereto a small percentage of crude cottonseed oil which has been subjected to a deodorization process.

ROY C. NEWTON.
DONALD P. GRETTIE.